(12) United States Patent
Gil Pascual

(10) Patent No.: US 11,025,050 B2
(45) Date of Patent: Jun. 1, 2021

(54) DEVICE FOR CONNECTING AN ELECTRIC POWER SOURCE WITH AN ELECTRIC APPLIANCE

(71) Applicant: Miguel Ángel Gil Pascual, Viver (ES)

(72) Inventor: Miguel Ángel Gil Pascual, Viver (ES)

( * ) Notice: Subject to any disclaimer, the term of this patent is extended or adjusted under 35 U.S.C. 154(b) by 0 days.

(21) Appl. No.: 16/658,337

(22) Filed: Oct. 21, 2019

(65) Prior Publication Data

US 2021/0119440 A1    Apr. 22, 2021

(51) Int. Cl.
| | |
|---|---|
| *A63G 31/12* | (2006.01) |
| *H02H 6/00* | (2006.01) |
| *G01P 5/00* | (2006.01) |
| *G08B 21/02* | (2006.01) |
| *H02G 11/02* | (2006.01) |

(52) U.S. Cl.
CPC .............. *H02H 6/00* (2013.01); *A63G 31/12* (2013.01); *G01P 5/00* (2013.01); *G08B 21/02* (2013.01); *H02G 11/02* (2013.01)

(58) Field of Classification Search
CPC ........ A63G 31/00; A63G 31/12; G08B 21/00; G08B 21/18; G08B 21/182
USPC .......... 472/134; 446/220–226; 340/663, 657, 340/660, 661
See application file for complete search history.

(56) References Cited

U.S. PATENT DOCUMENTS

| | | | | |
|---|---|---|---|---|
| 5,685,122 A | * | 11/1997 | Brisbane | ................. E04H 15/22 52/1 |
| 6,650,246 B2 | * | 11/2003 | Field | .................... G08B 21/185 340/657 |
| 2015/0148141 A1 | * | 5/2015 | Thompson | ............. A63G 31/12 472/134 |

* cited by examiner

*Primary Examiner* — Kien T Nguyen
(74) *Attorney, Agent, or Firm* — Rumit Ranjit Kanakia

(57) ABSTRACT

A device (1) for connecting an electric power source (8) with an electric appliance (9) comprising a first electric coil (4), connecting the electric power source (8) with the device (1) and a second electric coil (5), connecting the electric appliance (9) with the device (1), at least one sensor (6) arranged outside the device (1) for identifying a speed of air, an alarm device connected to the at least one sensor (6) configured such that depending on the speed of air generates a pre-alarm signal and/or a main alarm signal and/or cuts an electric connection between the electric power source (8) and the electric appliance (9), and an electric circuit having an input element (7) configured such that by operating the input element (7) after the end of a preset period of time, the electric connection between the electric power source (8) and the electric appliance (9) is activated, if the at least one sensor (6) does not identify a preset speed of air.

20 Claims, 3 Drawing Sheets

DEVICE FOR CONNECTING AN ELECTRIC POWER SOURCE WITH AN ELECTRIC APPLIANCE

FIELD OF THE INVENTION

The present invention relates to a device for connecting an electric power source with an electric appliance. More particularly, the present invention relates to a device that incorporates wind detection and measurement means for use outside in open air condition.

BACKGROUND OF THE INVENTION

Inflatable toys such as castles for children to play inside have grown increasingly popular in recent years for several reasons including their portability, ease of operation and fanciful shapes, colors and sizes that appeal to young children. Inflatable toys always require at least three elements, the toy itself, an electric appliance such as a fan in constant operation, and an electric cord extension. The most frequent risk and accidents with inflatable toy castles are caused by excessive wind condition, where the toy itself can literally take off and be a danger to the children inside. Impact of strong winds during the installation on the outside can cause personal injury.

There are several devices related to additional elements to be installed for the purpose of control and alarm of excessive wind, but all of them have the disadvantage that those additional elements have to be carried along with the rest of the essential elements, require more space during transportation, and require specific attention and time for its installation. They usually may be forgotten to be installed, and/or simply disregarded by the user setting up the installation of the inflatable toy due to ease of work or lack of time. Also, and even in the case that the person at charge specifically installs those additional control and alarm elements, they still require permanent attention and supervision, as well as manual intervention in case of a strong wind condition and/or alarm event to cut the electric supply to the fan.

There are various inventions and devices in use which are used to improve the safety of inflatable attractions and other inflatable devices, some of which are as discussed here.

One such device relates to an air bounce with a safety monitoring system and a control method for securing safety which secure safety of an air bounce product used as a slide. The air bounce comprises: a main body unit which is formed in a hollow body, receives air, and has a prescribed shape; a slide tube body which is formed on the main body and has an inclined bottom unit which is extended and forms a prescribed inclination; an upper end guide unit formed on an upper end of the inclined bottom unit of the slide tube body; and an impact absorbing unit formed on a lower end of the inclined bottom unit of the slide tube body. Preferably, the air bounce further comprises: a second support unit which is formed on a lower surface of the inclined bottom unit, and has a cross section of a right triangle shape to allow a bottom thereof to come in contact with the ground, and allow an upper surface thereof to be connected to the lower surface of the inclined bottom unit; a first support unit connected to the upper end guide unit to be extended below the upper end guide unit, wherein a bottom thereof comes in contact with the ground, and a pressure sensor is disposed therein; a bottom rise sensor disposed on the bottom of the second support unit; an inclined guide unit extended from both sides of the inclined bottom unit; and an infrared sensor disposed on an inner side of a lower end of the inclined guide unit. The control method for securing safety is realized by a pneumatic detection pressure sensor, a rise sensor, an airflow meter sensor to detect wind strength and an infrared sensor.

Another system relates to using a blower device to maintain an inflatable carnival attraction at a level of inflation safe for using the inflatable attraction, wherein the blower device operates on electrical energy received from an external source, monitoring the electrical energy, and triggering an alarm if the electrical energy is insufficient for the blower device to maintain the level of inflation safe for using the inflatable attraction, wherein the alarm is of sufficient loudness to be heard by personnel operating the attraction at a location distant from the blower device.

Another system relates to an automated inflatable perfected castle, constituted from a traditional bouncy castle incorporating the inflation system compressor/turbine to inflate the castle. A timer is activated by an electronic wallet, and that once estimated by the timer ends the system compressor/turbine to stop inflating the castle. A buzzer has been added to alert the engine stop few seconds before this occurs, and a perimeter structure with canvas or transparent plastic that protects the deflated canvas while holding the highest parts of the bouncy castle to prevent it from falling on children to deflate.

Although they improve the safety of inflatable attractions, none of the above mentioned devices provide a means to automatically intervene and cut the electrical supply following detection of a preset environmental condition, which will result in the inflatable toy materially not taking off because the fan will cease to operate and the inflatable structure will gain weight and stop functioning so that the children inside will have the time and alert to leave the object.

Therefore, there is a need for a device that incorporates wind detection and measurement means, preferably an anemometer, a visual and/or acoustic alarm to alert the user of the speed of wind having exceeded a preset value, and means for cutting an electric connection between the electric power source and the electric appliance when the speed of wind is over the preset value for more than a preset time, and/or an active alarm exceeds a preset duration and no manual operation from a user is detected.

OBJECTIVES OF THE INVENTION

It is an object of the present invention to provide a device for connecting an electric power source with an electric appliance.

Another object of the present invention is to provide a device that is mainly aimed at use outside in open air condition, and focuses mainly on inflatable toys such as castles for children to play inside.

Yet another object of the present invention is to provide a device that incorporates wind detection and measurement means.

Yet another object of the present invention is to provide a device that incorporates a means for cutting an electric connection between the electric power source and the electric appliance following detection of a preset given circumstance.

Yet another object of the present invention is to provide a device that requires no manual intervention to cut the electric supply in case of a strong wind condition and/or alarm event.

These and other objects of the present invention will become more evident from the detailed description of the preferred embodiment given below taken in conjunction with the drawings.

SUMMARY OF THE INVENTION

Before the present system(s) are described, it is to be understood that this application is not limited to the particular system(s) described, as there can be multiple possible embodiments, which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a device for connecting an electric power source with an electric appliance. This summary is not intended to identify essential features of the claimed subject matter nor is it intended for use in determining or limiting the scope of the claimed subject matter.

The present invention accomplishes the above mentioned objectives by providing a device for connecting an electric power source with an electric appliance comprising a first electric coil which connects the electric power source with the device and a second electric coil, which connects the electric appliance with the device. The device comprises at least one sensor arranged outside the device for identifying the speed of air, at least one alarm device connected to the at least one sensor and an electric circuit which is connected with the at least one sensor and the at least one alarm device and having an input element.

The at least one alarm device is configured such that dependent on speed of air and/or a variation of the speed of air it generates a pre-alarm signal and/or a main alarm signal and/or cuts an electric connection between the electric power source and the electric appliance. The electric circuit is configured such that by operating the input element after the end of a given time period the electric connection between the power source and the electric appliance is activated, if the at least one sensor does not identify a preset speed of air. The electric circuit is configured such that after an electric cut following a pre-alarm and/or a main alarm signal event no resuming of the electrical supply is allowed until the at least one sensor detects a speed of air below the preset value during a preset period of time.

BRIEF DESCRIPTION OF THE DRAWINGS

The foregoing detailed description of embodiments is better understood when read in conjunction with the appended drawings. For the purpose of illustration of the present subject matter, an example of construction of the present subject matter is provided as figures; however, the invention is not limited to the specific method and system disclosed in the document and the figures.

It is therefore to be noted that the appended drawings illustrate only typical embodiments of this invention and are therefore not to be considered for limiting its scope, for the invention may admit to other equally effective embodiments.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 3:
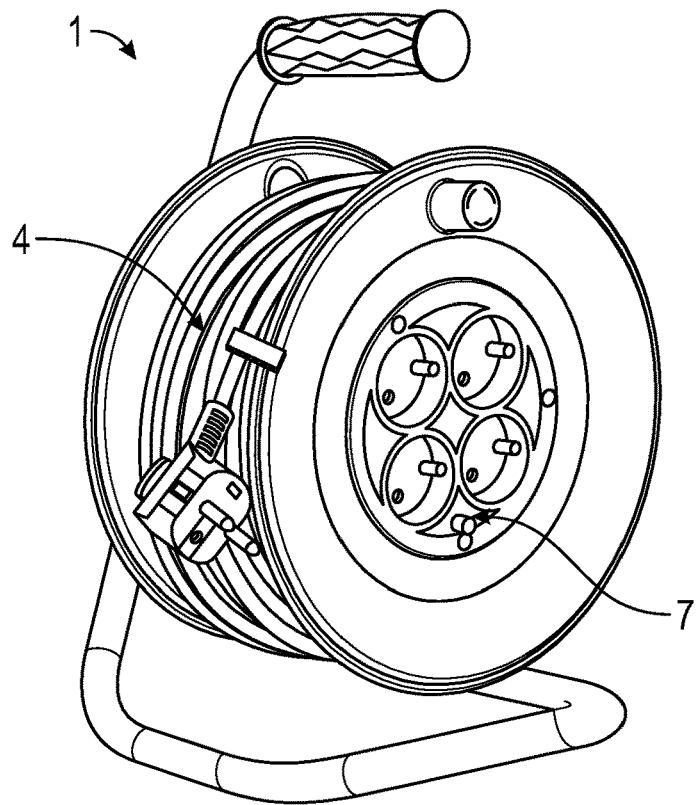
FIG. 3 is a perspective view of a first alternate embodiment of the device according to the present invention.
Figure 4:
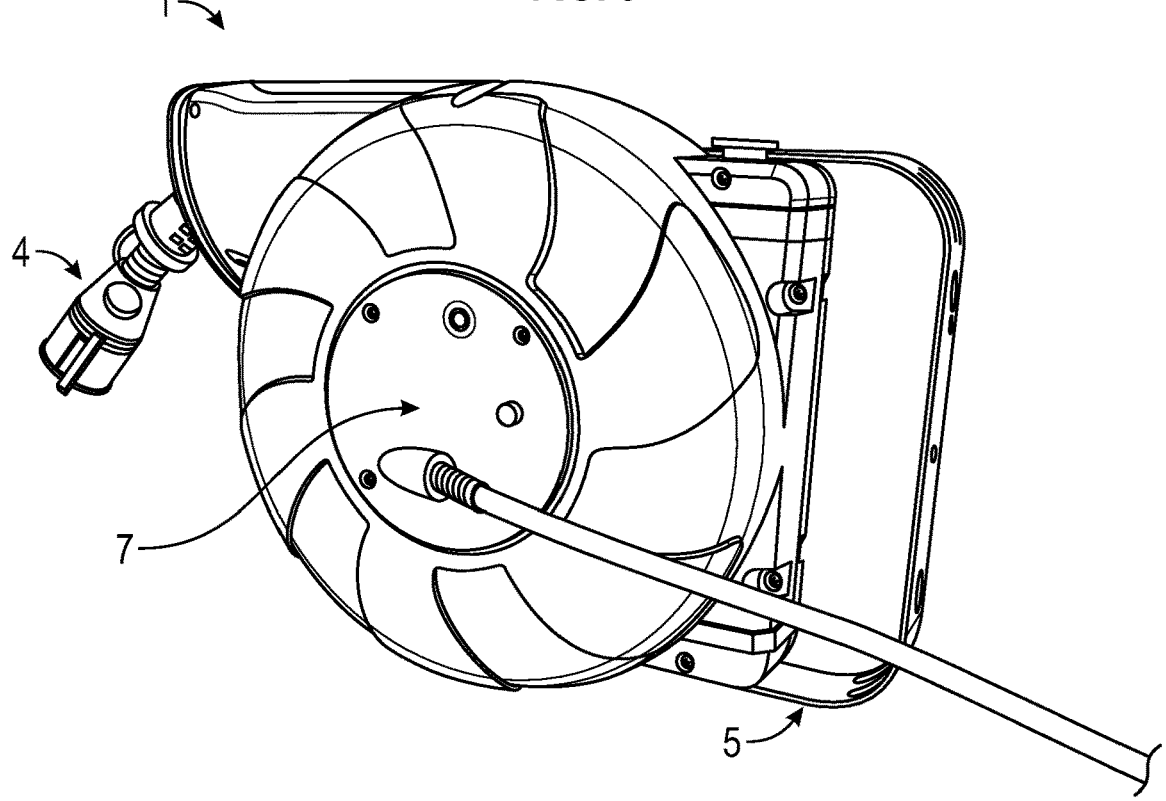
FIG. 4 is a side view of the first alternate embodiment of the device according to the present invention.

In a preferred embodiment of the present invention, a device (1) for connecting an electric power source (8) with an electric appliance (9) is disclosed. The device (1) comprises a first electric coil (4), which connects the electric power source (8) with the device (1) and a second electric coil (5), which connects the electric appliance (9) with the device (1). The preferred embodiment may be a rollable electric cord extension as illustrated in FIGS. 3 and 4, whereby it incorporates additional functions.

The device (1) further comprises at least one sensor (6) arranged outside the device (1) for identifying speed of the air, at least one alarm device connected to the at least one sensor (6), and an electric circuit which is connected with the at least one sensor (6) and the at least one alarm device and having an input element (7). The at least one alarm device is configured such that depending on speed of air and/or a variation of the speed of air it generates a pre-alarm signal and/or a main alarm signal and/or cuts an electric connection between the electric power source (8) and the electric appliance (9). The electric circuit is configured such that by operating the input element (7) after the end of a given time period the electric connection between the electric power source (8) and the electric appliance (9) is activated, if the at least one sensor (6) does not identify the preset speed of air.

According to one aspect of the preferred embodiment, the electric circuit is configured such that after an electric cut following a pre-alarm and/or a main alarm signal event no resuming of the electrical supply is allowed until the at least one sensor (6) detects a speed of air below the preset parameter during the preset period of time. The device (1) is configured such that an electric connection between the electric power source (8) and the electric appliance (9) is activated during a given time period and is cut at the end of that given time period.

According to another aspect of the preferred embodiment, the pre-alarm signal and/or the main alarm signal may be a visual signal and/or an acoustic signal. The acoustic pre-alarm signal and/or the acoustic main alarm signal comprise different sound frequencies and/or different volumes. The visual pre-alarm signal and/or visual main alarm signal comprises different colors. Further, the at least one alarm device is configured such that, apart from the visual pre-alarm signal and the visual main alarm signal, it generates a visual signal during the operation of the device (1) outside the times of a pre-alarm event and outside the times of a main alarm event.

According to another aspect of the preferred embodiment, the at least one sensor (6) is an anemometer. The anemometer may be any of the following: an anemometer of rotation or airscrew, an anemometer of hot filament, a pressure anemometer, an anemometer of compression or pilot tube, or an ultra-sonic anemometer.

According to another aspect of the preferred embodiment, the electric appliance (9) is an electric motor of a ventilator. The ventilator is assigned to an inflatable object such as an inflatable toy castle (10). The device (1) is arranged at a location between the electric power source (8) and the electric appliance (9) which may be the inflatable toy castle (10). The location of the device (1) between the electric power source (8) and the inflatable toy castle (10) is at a distance within a range of 8 to 12 meters from each.

According to another aspect of the preferred embodiment, the device (1) comprises an external aerodynamic shape, as illustrated in FIG. 3, configured such that the wind influence over it increases the stability of the device (1) and prevents it from rollover.

In an alternate embodiment of the present invention, the external shape of the device (1) comprises a base part of a greater area than its intermediate and/or superior part as illustrated in FIG. 4. The external shape of the device (1) may be pyramid shaped.

Additional and secondary specific features may also be incorporated in the device (1), such as means for global positioning such as GPS locator, means for detection of connection to the electric power source (8) and record of date and time of such and other events, as well as means for transmitting all the mentioned data to an external device such a smartphone, a tablet or a computer, and/or to display it in a built-in screen, all of which have several applications as personnel or staff supervision and control among others.

Figure 1:
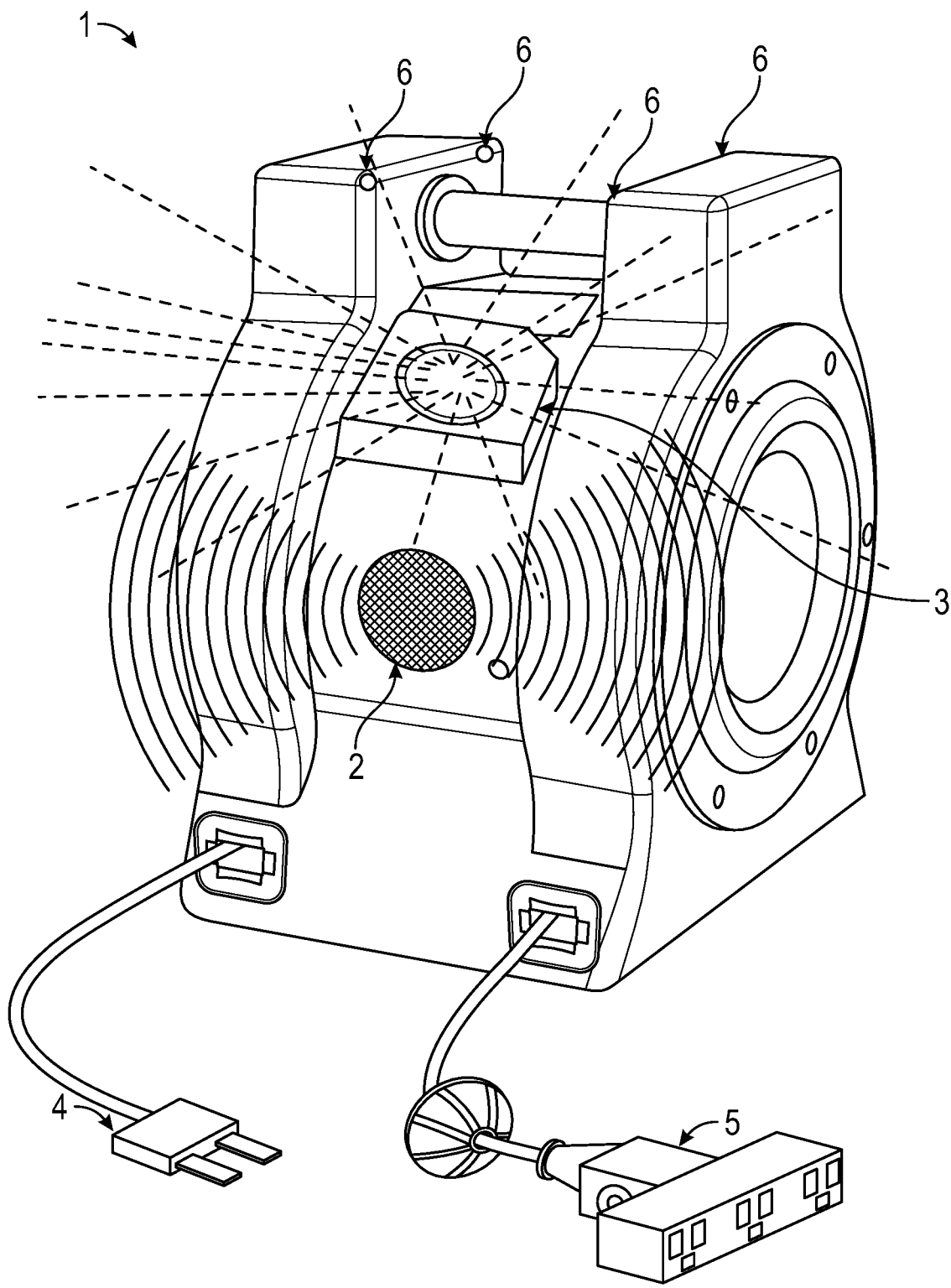
FIG. 1 is a perspective view of a preferred embodiment of a device for connecting an electric power source with an electric appliance according to the present invention.
Figure 2A:
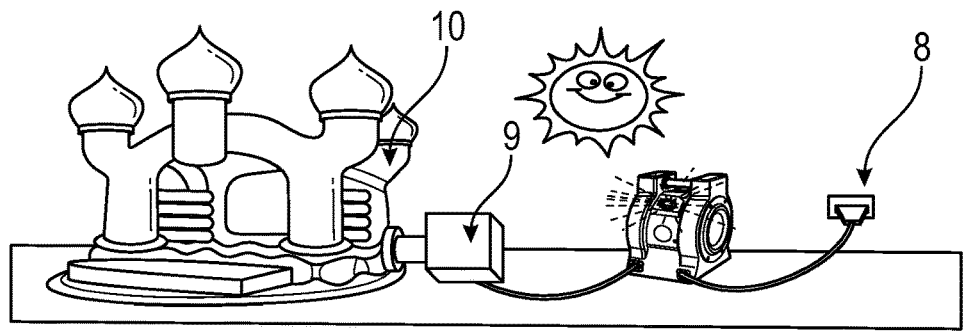
FIG. 2 illustrates the device in operation according to the preferred embodiment of the present invention.
Figure 2B:
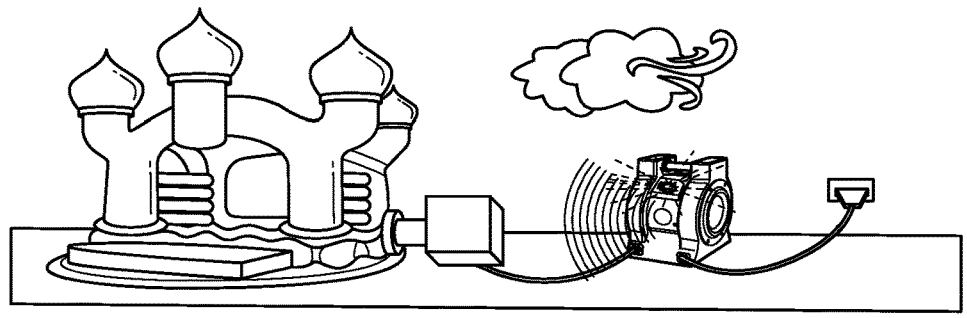
Figure 2C:
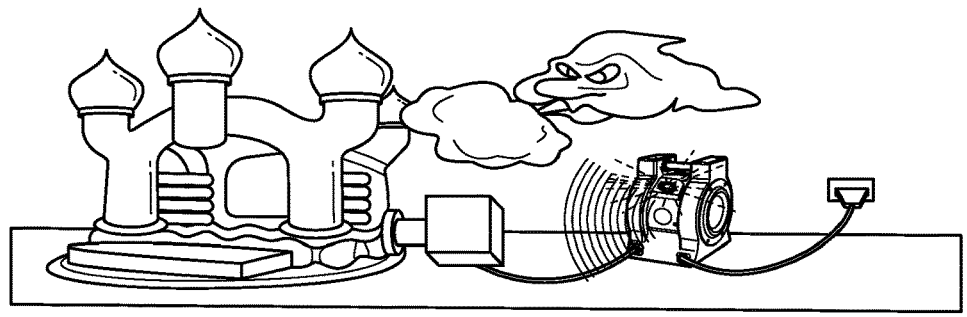

According to another aspect of the preferred embodiment, the device (1) operates in different modes of operation depending on the speed of air, as illustrated in FIGS. 2A-2D. When the speed of air is below the preset value, a fixed visual signal is shown on a second alarm device (3) as illustrated in FIG. 2A. The fixed visual signal is green in color. There is no acoustic signal during this mode of operation. When the speed of air is above a pre-alarm preset value, a blinking visual signal is shown on the second alarm device (3) as illustrated in FIG. 2B. The blinking visual signal is yellow in color. In addition, an acoustic intermittent pre-alarm signal is given by a first alarm device (2). When the speed of air is above an alarm preset value, the blinking visual signal is shown on the second alarm device (3) as illustrated in FIG. 2C. The blinking visual signal in such a scenario is red in color. In addition, an intermittent acoustic alarm signal is also given by the first alarm device (2). This indicates that the inflatable toy castle (10) is to be evacuated and the electric power supply is advised to be cut manually.

Figure 2D:
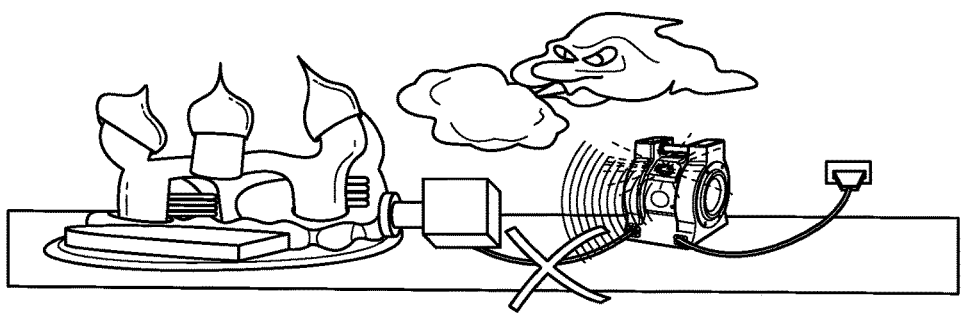

When the speed of air is above the alarm preset value during the preset period of time and no manual cut of the electrical supply has taken place, the red blinking visual signal stops blinking and stays fixed as illustrated in FIG. 2D. Further, the acoustic alarm signal also changes to continuous mode, and the device (1) automatically cuts the electrical supply. The device (1) will not allow a reset to resume the electrical supply until it detects the speed of air below the preset value.

With the device (1) of the present invention several advantages are met. firstly, the device (1) itself has means to automatically intervene and cut the electrical supply following detection of the preset given circumstance. Secondly, no human failure in the installation of an additional wind detector and alarm elements can take place (the device set up is automatically when connected to the electric supply), and no inactivity of the user following a strong wind and/or alarm event can take place because the electric supply cut is also automatic. Moreover, the installation of the device cannot be forgotten, as it is absolutely essential to be installed in each and every inflatable toy because an electric cord extension is always needed and the electric supply is as well required to operate the fan.

The invention has been described with reference to various specific and illustrative embodiments and techniques. However, it should be understood that many variations and modifications may be made while remaining within the spirit and scope of the invention.

I claim:

1. Device (1) for connecting an electric power source (8) with an electric appliance (9), the device (1) comprising:
   at least a first electric coil (4) which connects the electric power source (8) with the device (1), and the device (1) is further connected to the electric appliance (9); and
   wherein characterized in that, the device (1) further comprising:
   at least one sensor (6) arranged outside the device (1) for identifying a determining speed of air; and
   at least one alarm device connectable to the at least one sensor (6), the at least one alarm device generating a pre-alarm signal and/or a main alarm signal when the at least one sensor (6) determines the speed of air above a preset value of speed of air and the at least one alarm device comprised in the device (1) automatically disconnecting an electric connection between the electric power source (8) and the electric appliance (9) when the at least one sensor (6) determines the speed of air above a preset value of speed of air.

2. Device (1) according to claim 1, characterized in that the device (1) further comprises a second electric coil (5) or an extension cord which connects the device (1) with the electric appliance (9).

3. Device (1) according to claim 2, characterized in that the at least one alarm device is configured to generate a pre-alarm signal and/or a main alarm signal and/or to automatically disconnect an electric connection between the electric power source (8) and the electric appliance (9) being dependent on the speed of air and/or a variation of the speed of air as determined by the at least one sensor, and when the at least one sensor (6) determines the speed of air above a preset value of speed of air and for a preset duration of time and when no manual operation from a user is detected for a preset duration of time.

4. Device (1) according to claim 3, characterized in that the pre-alarm signal and/or the main alarm signal may be a visual signal and/or an acoustic signal.

5. Device (1) according to claim 4, characterized in that the acoustic pre-alarm signal and/or the acoustic main alarm signal comprises different sound frequencies and/or different volumes.

6. Device (1) according to claim 4, characterized in that the visual pre-alarm signal and/or the visual main alarm signal comprises different colors.

7. Device (1) according to claim 6, characterized in that the at least one alarm device is configured to further generate a visual signal during the operation of the device (1) outside times of a pre-alarm and outside times of a main alarm, without the visual pre-alarm signal and the visual main alarm signal generating alarm signals.

8. Device (1) according to claim 1, characterized in that the at least one sensor (6) is an anemometer.

9. Device (1) according to claim 8, characterized in that the anemometer is at least of one of an anemometer of rotation or airscrew, an anemometer of hot filament, a pressure anemometer, an anemometer of compression or pilot tube, or an ultra-sonic anemometer, individually or in any combination.

10. Device (1) according to claim 1, characterized in that the device (1) is connected to the electric appliance (9) via at least a second electric coil comprised in the device (1), wherein the electric appliance (9) which is embodied as an electric motor of a ventilator.

11. Device (1) according to claim 10, characterized in that the ventilator is connected to an inflatable object.

12. Device (1) according to claim 11, characterized in that the inflatable object is an inflatable toy object.

13. Device (1) according to claim 12, characterized in that the device (1) is arranged at a location between the electric power source (8) and the inflatable object.

14. Device (1) according to claim 13, characterized in that the location of the device (1) between the electric power source (8) and the inflatable object is at a distance within a range of 8 to 12 meters from each of the device (1) and the inflatable object.

15. Device (1) according to claim 14, characterized in that the device (1) is configured to activate an electric connection between the electric power source (8) and the electric appliance (9) during a given time period and to deactivate the electric connection between the electric power source (8) and the electric appliance (9) at end of that given time period.

16. Device (1) according to claim 15, characterized in that
the device (1) further comprises an electric circuit which is connected with the at least one sensor (6); and
the electric circuit is connected with an input element (7), and the electric circuit is configured to operate the input element (7) to activate the electric connection between the electric power source (8) and the electric appliance (9) if the at least one sensor (6) does not identify a preset speed of air after the end of the given time period.

17. Device (1) according to claim 16, characterized in that the electric circuit is configured to not allow resuming of the electrical connection between the electric power source (8) and the electric appliance (9) after an electric cut following the pre-alarm signal event and/or the main alarm signal event, until the at least one sensor (6) detects the speed of air below a preset parameter during a preset period of time.

18. Device (1) according to claim 17, characterized in that the device (1) further comprises an external aerodynamic shape which is configured such that the wind influence over it increases the stability of the device (1) and prevents it from rollover.

19. Device (1) according to claim 18, characterized in that the external aerodynamic shape of the device (1) comprises a base part of a greater area than its intermediate and/or superior part, and/or the external aerodynamic shape of the device (1) is pyramid shaped.

20. Device (1) according to claim 1, characterized in that the device (1) further comprising at least one of, either individually or in combination:
means for locating global positioning such as including at least a GPS locator;
means for detection of connection to the electric power source (8);
means for recordal of date and time of an event;
means for transmitting data to an external device including at least one of a smartphone, a tablet or a computer, and/or means to display the data in a built-in screen.

* * * * *